June 1, 1965   G. A. MARSH ETAL   3,186,931
FERROUS ELECTRODE
Filed June 26, 1962

INVENTORS
GLENN A. MARSH
BY EDWARD SCHASCHL
ATTORNEY

United States Patent Office 3,186,931
Patented June 1, 1965

3,186,931
FERROUS ELECTRODE
Glenn A. Marsh and Edward Schaschl, Crystal Lake, Ill., assignors to The Pure Oil Company, Chicago, Ill., a corporation of Ohio
Filed June 26, 1962, Ser. No. 205,266
6 Claims. (Cl. 204—197)

This invention relates to an improved sacrificial anode system for use in the galvanic protection of underground and submerged structures fabricated of ferrous metals. The invention also relates to packaged anodes for protecting buried or submerged structures.

In galvanic systems for the cathodic protection of pipelines and other underground or submerged structures, sacrificial anodes of a metal higher in the electromotive series than the structure, usually magnesium or zinc, are buried in the earth near the structure and connected to it by electrical conductors. The resulting flow of current maintains the structure cathodic with respect to the soil or water and greatly minimizes or prevents corrosion. The prior art recognizes the desirability of providing a prepared bed or backfill designed to control the environment surrounding the anode. The prior art further teaches the preparation of packaged anodes which are surrounded by a prepared environment and are ready for installation without special backfill.

Usually, the backfill or prepared environment is intended to enhance the characteristics of the particular metal, such as magnesium or zinc, of which the anode is fabricated. The prior art has long searched to improve the efficiency of sacrificial anodes to reduce the cost per unit of current-day output of the anode. The prior art has further sought to reduce the cost per unit of output by employing cheaper metals as the anode. It has nevertheless been found that when less expensive anode metals, such as scrap iron, were employed as anodes it was necessary to provide an auxiliary current source to drive current from the anode to the structure to be protected. The cost of installation and operation of the auxiliary current source was sometimes greater than the saving effected by the use of the less expensive metal.

It has now been found that ferrous structures can be protected by ferrous metal anodes, such as anodes composed of scrap iron, if a specially prepared barrier or backfill is employed around the iron anode. It is therefore a primary object of this invention to provide a sacrificial anode system in which a ferrous metal anode can be used to protect a ferrous metal structure without the necessity of employing an auxiliary current source.

Another object of this invention is to provide a packaged anode for protecting buried or submerged ferrous metal structures, which packaged anode incorporates a ferrous metal sacrificial anode. Another object of this invention is to reduce the cost of the cathodic protection of ferrous metal structures.

Briefly, the method of this invention comprises disposing a sacrificial anode fabricated of a ferrous metal, such as scrap iron or scrap steel, in contact with the earth or water in which a ferrous structure to be protected is buried or submerged. The anode and structure are electrically connected by means of a conductor, and a special barrier is provided around the anode. The barrier is characterized by impermeability to water, and by electrolytic conductivity, or the capability of sustaining the passage of an electrolytic or ionic current.

Buried or submerged structures which are subject to rapid galvanic corrosion generally exist in a damp, aerated environment. It has been found that the oxygen which sustains galvanic corrosion can find its way to the cathodic area of submerged structures by dissolving in the body of water in which the structure is submerged. Similarly, air is carried to buried structures by dissolving in rain water which drains downward from the surface of the earth to the buried structure. It has further been found that when a ferrous metal anode is buried adjacent to a ferrous structure to be protected, the potential of the ferrous anode and structure will be the same if the oxygen concentrations at the anode and at the structure are the same, but the anode will become sufficiently negative with respect to the structure to provide a cathodically protecting current if the oxygen concentration at the anode is reduced substantially to zero while the oxygen concentration at the structure remains unchanged.

In accordance with this invention, a barrier or enclosure is placed around the ferrous metal anode to exclude oxygen therefrom. It is necessary, however, that the barrier be capable of conducting an electrolytic current, so that the anode is not electrically isolated from the structure to be protected. In accordance with this invention, the anode is surrounded by a barrier material which is characterized as being substantially impermeable to the water which carries dissolved oxygen downward through the earth or to the water in which the structure is submerged, but is electrolytically conductive, that is, capable of sustaining the passage of an electrolytic current.

Suitable barrier materials include, for example, animal tissue, agar-agar, silica gel, and alumina gel. Where a relatively thick barrier of a moisture-absorbing material such as animal tissue, agar-agar, silica gel, etc., is used, it is preferred to incorporate therein a small amount of a highly ionizing salt, such as sodium chloride or sodium sulfate, to increase the electrolytic conductivity of the barrier. The barrier will of course itself absorb or adsorb sufficient water or electrolyte from the surrounding earth to maintain a high electrolytic conductivity.

An especially preferred barrier for isolating buried ferrous metal anodes from oxygen-containing ground water is a mixture of sandy soil with about 1 percent to 10 percent by weight of bentonite. The bentonite is capable of adsorbing and retaining a small amount of ground water or electrolyte, and therefore maintains a high electrolytic conductivity. Upon absorbing water, the bentonite swells and forms with the sandy soil a barrier capable of resisting the influx of additional ground water. Thus, the barrier material will in itself be damp or even wet, but will be impermeable to the flow of additional quantities of ground water. The bentonite will retain moisture even during dry periods, and when again wetted will absorb some additional amounts of water to maintain electrolytic conductivity. Such a barrier, which, although damp, is capable of resisting the flow of additional quantities of water, meets the definition of a substantially water-impermeable barrier, as these terms are used in this specification and in the appended claims.

Similarly, agar-agar, silica gel, and alumina gel, while moist or wet, are capable of forming a water-impermeable sheath which will prevent the carrying of dissolved air to a ferrous metal anode. Where the ground or lake water which will contact the anode system does not contain sufficient salts to have a very high electrolytic conductivity, it is preferred to incorporate in the agar-agar, silica gel, etc., a small amount of a highly ionizing salt to enhance the electrolyte conductivity of the barrier.

The invention will be described in detail in conjunction with the drawing, of which:

Figure 1:
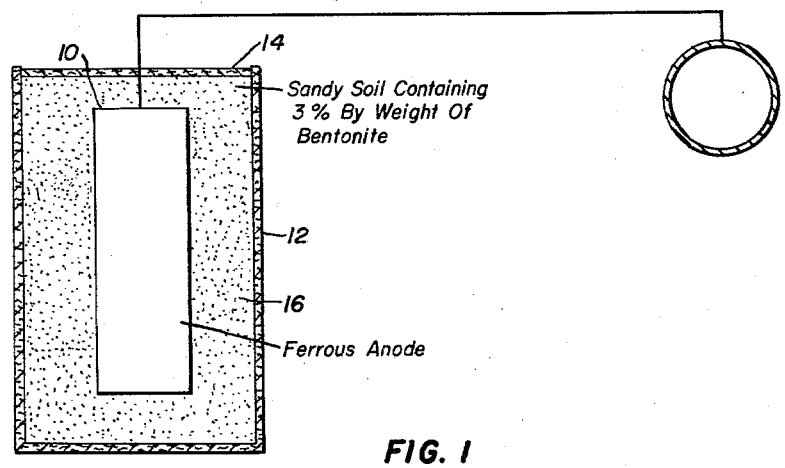
FIGURE 1 is a sectional view of a buried pipeline, and an anode system therefor fabricated in accordance with this invention.

Referring to FIGURE 1, ferrous metal anode 10 is disposed within a water permeable container 12 which is provided with a cover 14. The anode 10 is disposed in spaced relationship with respect to the container 12, and the space between the anode and container is occupied by barrier material 16, which is characterized by a relatively high electrolytic conductivity and impermeability to ground water. This barrier material may be of any of the aforedescribed materials, but for buried anodes is preferably a mixture of sandy soil in which is incorporated about 3 percent by weight of bentonite and 1 percent by weight of sodium chloride. The anode 10 is preferably made of steel scrap such as pipe, rails, plate, ingots, compressed automobile bodies, etc., which may be used singly or welded together, depending upon their size. Preferably, wire screen, thin sheets of metal, and other materials having thin cross sections, are not used. In general, it is preferred that the anodic surface area be greater than is conventional with anodes made of magnesium. Ideally, the surface area of the anode will range upward to about equal to the surface area of the object to be protected, but the method of this invention operates satisfactorily in most cases if the area of the anode is not less than about 5 percent of the area of the object to be protected. Container 12 may be fabricated of any porous material which has sufficient rigidity to maintain the packaged anode as a unit prior to installation. A material which is permeable to moisture, and preferably capable of spontaneous disintegration when buried, is preferred. For example, the container 12 may be fabricated of thick porous paper, such as blotting paper, of porous cardboard, or of pressed peat or pressed porous fibers. Other such materials of the kind conventionally employed for fabricating containers in which live plants, shrubbery, etc. are sold and intended to be retained around the plant roots when buried, can be used.

It is, of course, possible to install the cathodic protection system of FIGURE 1, in accordance with this invention, by merely digging a hole for the anode, disposing the anode therein, and backfilling with a suitable barrier material as aforedescribed to isolate the ferrous metal anode from oxygen-containing ground water. When thus constructed, the container 12 and cover 14 will be omitted.

After installation, it is preferred to saturate the soil in which the anode is buried with water, so that the barrier material can absorb water and become electrolytically conductive. Where the barrier material contains an active agent such as bentonite, the initial soak will cause the bentonite to swell and form a barrier mass which is impermeable to ground water. The small amount of oxygen carried to the ferrous metal anode when installed is quickly consumed by local corrosion, and the anode then becomes sufficiently anodic with respect to the structure to be protective to provide effective cathodic protection therefor.

Figure 2:
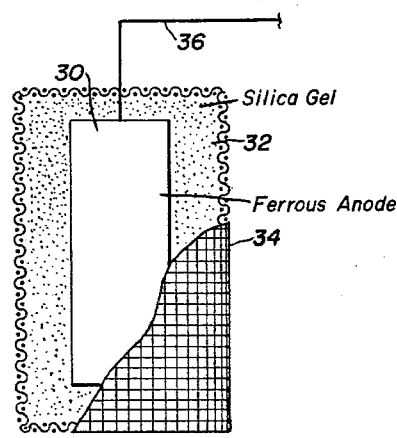
FIGURE 2 is a fragmentary sectional view of a packaged anode fabricated in accordance with this invention.

Referring to FIGURE 2, a packaged anode assembly intended for use in sea water is shown. Ferrous metal anode 30 is enclosed in a barrier 32 of silica gel. A water-permeable container 34, fabricated of a plastic screen, encompasses the barrier layer of silica gel and lends rigidly thereto. Conductor 36 is provided for connection to the structure to be protected.

As the ferrous metal anode corrodes, providing cathodic protection to the structure, the anode becomes coated with ferrous and ferric oxide which, in themselves, are partial barriers against the diffusion of oxygen. Hence, the system is substantially self-sustaining, without further attention or maintentance. While, in time, some deterioration of the barrier layer may be expected, the buildup of ferrous and ferric oxide deposits tends to supplement the oxygen-excluding character of the barrier. Therefore, the anode remains effective to cathodically protect the structure as long as the surface area of the anode remains sufficient to provide an adequate current density.

The embodiments of the invention in which an exclusive property or privilege is claimed are defined as follows:

1. A packaged sacrificial electrode for use in corrosion protection of ferrous structures comprising a ferrous metal electrode encased in a material selected from the group consisting of animal tissue, agar-agar, silica gel, alumina gel, and a mixture of sandy soil and about 1 to 10 percent by weight of bentonite, said materials being capable of excluding the continuous influx of water containing dissolved oxygen.

2. The electrode in accordance with claim 1 wherein said materials include a small amount of a strongly ionizing salt.

3. A packaged sacrificial electrode for use in corrosion protection of ferrous structures comprising a water-permeable container, a ferrous metal electrode disposed within said container in spaced relationship therewith and a material, selected from the group consisting of animal tissue, agar-agar, silica gel, alumina gel, and a mixture of sandy soil and about 1 to 10 percent by weight of bentonite, filling the space between said electrode and said container, said materials being capable of excluding the continuous influx of water containing dissolved oxygen.

4. A packaged sacrificial electrode in accordance with claim 3 in which said material additionally includes a small amount of a strongly ionizing salt.

5. In combination with an underground structure fabricated of a ferrous metal, a cathodic protection system comprising a sacrificial ferrous metal electrode buried in the earth near said structure and electrically connected thereto, said electrode being enclosed by and in intimate contact with a material selected from the group consisting of animal tissue, agar-agar, silica gel, alumina gel, and mixture of sand soil and about 1 to 10 percent by weight of bentonite, said material being capable of excluding the continuous influx of water containing dissolved oxygen.

6. A device in accordance with claim 5 in which the said material includes a small amount of a strongly ionizing salt.

References Cited by the Examiner
UNITED STATES PATENTS

| | | | |
|---|---|---|---|
| 2,495,466 | 1/50 | Miller | 204—197 |
| 2,565,544 | 8/51 | Brown | 204—197 |

WINSTON A. DOUGLAS, *Primary Examiner.*

JOHN R. SPECK, MURRAY TILLMAN, *Examiners.*